United States Patent Office 2,710,830
Patented June 14, 1955

2,710,830
METHOD OF PREPARING NITRO ALIPHATIC COMPOUNDS

Herman T. Roy, Jr., Cleveland Heights, Ohio, assignor to The General Tire and Rubber Company, Akron, Ohio, a corporation of Ohio No Drawing. Application August 15, 1949,
Serial No. 110,471

1 Claim. (Cl. 202—42)

This invention relates to the preparation of aliphatic nitro compounds. It particularly relates to a method of separating aliphatic nitro alcohols and esters in relatively pure form from mixtures containing them without undergoing the hazards previously encountered in their purification.

Nitro aliphatic compounds, such for example as the nitroacrylic esters, are now highly desirable for propelling rockets or jets at high velocity with little smoke. They may be prepared by a number of known methods from various well-known starting materials. Difficulties arise in the separation of the various nitro compounds from the reaction mixtures, especially when they have more than a moderately elevated boiling point at the distillation pressure. Aliphatic nitro compounds are generally quite reactive, particularly when they contain more than one nitro group, or a nitro group plus a partially reduced oxygen group for each three carbon atoms. The reactions that occur during the distillation or separation as heretofore practiced have prevented the attainment of good yields of these comparatively pure nitro compounds. This is particularly the case with nitro alcohols, their esters and the like.

The concentration of aliphatic nitro compounds by distillation has also been quite hazardous in that explosions frequently result. This is common in the concentration or distillation of the nitro aliphatic alcohols and their esters, such as the nitro aliphatic acrylic esters and the like, and from the residues of the components used in forming them. When nitroethanol, for example, was distilled from the mixture resulting upon its preparation, discoloration of the material first occurred in the distillation container. This discoloration often migrated to the distilled product and if an attempt was made to carry the distillation of the nitro alcohol mixture to a point where a good yield of the nitro alcohol was obtained, an explosion almost invariably resulted.

It is an object of the present invention to provide a method of separating nitro aliphatic compounds and particularly nitro alcohols and their esters from mixtures of such compounds with other organic compounds and with other nitro aliphatic compounds in particular.

It is another object of the present invention to provide a method of improving the yield of nitro alcohols and esters of such alcohols obtained from mixtures containing other compounds, whereby a relatively pure product is obtained without appreciable danger of explosion.

I have found that certain aromatic compounds, when mixed with crude nitro aliphatic compounds or mixtures containing crude nitro aliphatic compounds, act as azeotropes during the distillation thereof and facilitate the separation of the nitro aliphatic compounds to such an extent that one is able to obtain these nitro aliphatic compounds in high yield and in substantially pure form without serious danger of explosion as heretofore. The aromatic compounds are particularly desirable in the preparation of nitro alcohols and their saturated and unsaturated esters, which ordinarily contain a group of the following general formula, $$NO_2-R-CH-O-$$
$$\phantom{NO_2-R-CH-O}|$$
$$\phantom{NO_2-R-CH-O-}X$$

where R is an aliphatic group (preferably an aliphatic hydrocarbon group) of one to ten carbon atoms, and X is hydrogen or lower alkyl.

The aromatic compounds suitable as azeotropes in my process of separation of the nitro aliphatic compounds are characterized by having a higher boiling point than the nitro aliphatic compound to be separated from the mixture or from the crude reaction products. They are further characterized by having a higher molecular weight than benzene and by being free of functional groups, i. e. groups with a replaceable hydrogen, such as hydroxyl, carboxyl, amino, etc. which are capable of reacting with many nitro aliphatic compounds. The aromatic compounds should also contain at least one and preferably two mono-valent hydrocarbon radicals or groups, such as aryl, alkaryl and aralkyl groups.

Inasmuch as most nitro compounds are relatively high boiling materials, the aromatic compounds generally applicable as azeotropes have a boiling point higher than benzene and usually higher than toluene. In fact they should have a hydrocarbon group of at least six carbon atoms and should contain seven or more carbon atoms. And for convenience and safety, they should be liquid at the temperature at which distillation and condensation are effected. Compounds liquid at temperatures below 150° C. may be used and those which are liquids below 75° C. or at least below 100° C. are desirable when the distillation is accomplished at reduced pressure. Applicable aromatic compounds include the hydrocarbon aromatic compounds of seven or more carbon atoms, which are liquid at temperatures slightly below that at which distillation is affected. Examples of such compounds are the alkyl aromatic compounds such as xylene, biphenyl, bitoluyl, etc. the phenyl ethers of the general formula R'—O—R, where R' is the hydrocarbon aromatic group including aryl, aralkyl and alkaryl, and R is selected from the group consisting of aliphatic and aromatic radicals free from functional groups and including methyl, ethyl, amyl, propyl, octyl, and other alkyl groups, as well as phenyl, biphenyl, tolyl and xylyl groups. In the separation of a nitro aliphatic compound from a crude mixture or from a mixture of compounds, one or more of the aromatic compounds is added to the mixture to be separated, which is placed in a suitable container fitted with a condenser and suitable means, such as the conventional vacuum pump and traps for maintaining a reduced pressure. Upon sufficiently heating the mixture comprising the nitro aliphatic compound, a nitro aliphatic compound and the aromatic compound are removed as vapor. If there are more than one nitro aliphatic compound present, the lowest boiling nitro aliphatic compound is removed first. Upon condensation of the vapor, the aromatic compound and nitro aliphatic compound usually separate into two layers. The ether layer is returned to the distilling flask, where it is again used. If the compounds fail to separate sufficiently into two layers, the aromatic compound may be salted out or removed by solvent extraction with a highly volatile material. Aliphatic hydrocarbon solvents such as hexane, octane and other liquid paraffins are generally preferred for addition to the mixture. After the lowest boiling nitro aliphatic compound is removed, the next higher boiling compound goes over into the vapor and is separated in a similar manner.

This method of separation permits substantially all of the nitro aliphatic compounds to be removed without the temperature in the distilling flask increasing above the danger point or above the boiling point of the aromatic compound.

The following examples, in which parts are by weight, illustrate the present invention:

Example 1

A mixture of 2-nitro-1-ethanol, 2-nitropropanediol, and tris-(hydroxymethyl)-nitromethane, which was obtained by reacting a mixture comprising nitromethane and formaldehyde, was placed in a flask fitted with a suitable distillation column and equipped to maintain reduced pressure. To this mixture was added 100 grams of phenyl ether (diphenyl ether). The flask was heated to 80° C. and maintained at a reduced pressure of .5 mm. mercury. The condensate was cooled in a suitable separating apparatus and was found to be 65% 2-nitro-1-ethanol and 35% phenyl ether. The azeotropic mixture on cooling below 60° C. separated into two layers; the diphenyl ether layer was returned to the distillation flask.

For all practical purposes, the 2-nitro-1-ethanol is sufficiently pure to use as such. A slight amount of solubilized phenyl ether in the 2-nitro-1-ethanol layer is easily removed, however, by cooling the mixture to about 0° C. The nitro-ethanol thus obtained is in substantially pure form.

Example 2

To 100 parts of a mixture of beta-nitroethyl acrylate monomer and beta-nitroethyl acrylate polymer, and having other organic compounds as impurities, was added 100 grams of phenyl ether. The polymer which was insoluble in phenyl ether was separated by filtration. The filtrate was distilled under reduced pressure (0.5 mm.) and the azeotrope of beta-nitroethyl acrylate and phenyl ether was removed at 75 to 80° C. The beta-nitroethyl acrylate (63% of the azeotropic mixture) was separated by extracting the phenyl ether mixture with n-hexane. Distillation of the highly volatile hexane from the hexane-acrylate mixture thus obtained under reduced pressure gave nitroethyl acrylate in pure form.

In the above examples, the nitroethyl alcohol may be substituted by other aliphatic nitro compounds, including dinitropropane, nitropropane and other nitro aliphatic hydrocarbons, any one or more of the nitropropyl alcohols, nitrobutanols, and other nitro alcohols, up to 11 carbon atoms their esters with saturated and unsaturated aliphatic and aromatic carboxylic acids, including the alpha-beta unsaturated acids such as acrylic and methacrylic acids, maleic acid, etc. The phenyl ether may be substituted by any of the aromatic compounds above-described, including biphenyl, bitolyl, phenyl-tolyl, alkyl phenyl ethers, etc. Those compounds with more than one aromatic ring or with two monovalent hydrocarbon aryl groups are preferred.

Although the invention may be employed in various ways, only preferred embodiments have been illustrated and described. Other embodiments may be made within the invention as provided by the patent statutes.

What I claim is:

A method of separating beta-nitroethyl acrylate monomer from a crude mixture also containing beta-nitroethyl acrylate polymer and impurities obtained in the course of preparation of the beta-nitroethyl acrylate comprising the steps of adding diphenyl ether to the crude mixture, filtering off the insoluble polymer, distilling the filtrate to remove the azeotrope of beta-nitroethyl acrylate and diphenyl ether, and recovering beta-nitroethyl acrylate from the azeotropic mixture.

References Cited in the file of this patent
UNITED STATES PATENTS 2,465,959    Tindall _____ Mar. 29, 1949

OTHER REFERENCES

Horsley, "Azeotropic Data" from Analytical Chemistry for August 1947, pages 511, 517–519. (Copy in Scientific Library.)